US008688880B2

(12) United States Patent
Drapala et al.

(10) Patent No.: US 8,688,880 B2
(45) Date of Patent: Apr. 1, 2014

(54) CENTRALIZED SERIALIZATION OF REQUESTS IN A MULTIPROCESSOR SYSTEM

(75) Inventors: Garrett M. Drapala, Poughkeepsie, NY (US); Michael A. Blake, Wappingers Falls, NY (US); Timothy C. Bronson, Round Rock, TX (US); Lawrence D. Curley, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/821,933

(22) Filed: Jun. 23, 2010

(65) Prior Publication Data

US 2011/0320778 A1    Dec. 29, 2011

(51) Int. Cl.
*G06F 12/00* (2006.01)
*G06F 13/14* (2006.01)
*G06F 13/38* (2006.01)

(52) U.S. Cl.
USPC .......................................... 710/241; 710/240

(58) Field of Classification Search
USPC .................................................. 710/240, 241
See application file for complete search history.

(56) References Cited

U.S. PATENT DOCUMENTS

| 5,220,653 | A | * | 6/1993 | Miro ............................... 718/107 |
| 5,307,483 | A | * | 4/1994 | Knipfer et al. .................. 714/10 |
| 5,375,223 | A | * | 12/1994 | Meyers et al. ................. 711/151 |
| 5,448,702 | A | * | 9/1995 | Garcia et al. .................. 710/100 |
| 5,649,092 | A | * | 7/1997 | Price et al. ....................... 714/15 |
| 5,717,954 | A | * | 2/1998 | Grieff et al. ..................... 710/57 |
| 5,832,304 | A | * | 11/1998 | Bauman et al. ................. 710/40 |
| 5,890,001 | A | * | 3/1999 | Hall ............................... 710/240 |
| 5,905,876 | A | * | 5/1999 | Pawlowski et al. ............ 710/112 |
| 5,918,055 | A | * | 6/1999 | Crawford et al. ............. 710/240 |
| 6,038,651 | A | * | 3/2000 | VanHuben et al. ............. 712/21 |
| 6,078,998 | A | * | 6/2000 | Kamel et al. .................. 711/151 |
| 6,249,846 | B1 | * | 6/2001 | Van Doren et al. ............ 711/144 |
| 6,430,537 | B1 | * | 8/2002 | Tedesco et al. .............. 705/7.22 |
| 6,516,393 | B1 | | 2/2003 | Fee et al. |
| 6,601,150 | B1 | * | 7/2003 | Scheinbart et al. ........... 711/156 |

(Continued)

FOREIGN PATENT DOCUMENTS

EP  0495167 A2  7/1992
JP  05233422 A * 9/1993

(Continued)

OTHER PUBLICATIONS

"NN91086: Main Memory Database Computer Architecture", Aug. 1, 1991, IBM, IBM Technical Disclosure Bulletin, vol. 34, Iss. 3, pp. 6-12.*

(Continued)

*Primary Examiner* — Faisal M Zaman
(74) *Attorney, Agent, or Firm* — Cantor Colburn LLP; John Campbell

(57) ABSTRACT

Serializing instructions in a multiprocessor system includes receiving a plurality of processor requests at a central point in the multiprocessor system. Each of the plurality of processor requests includes a needs register having a requestor needs switch and a resource needs switch. The method also includes establishing a tail switch indicating the presence of the plurality of processor requests at the central point, establishing a sequential order of the plurality of processor requests, and processing the plurality of processor requests at the central point in the sequential order.

20 Claims, 5 Drawing Sheets

(56) References Cited

U.S. PATENT DOCUMENTS

| | | | |
|---|---|---|---|
| 6,651,124 B1* | 11/2003 | McAllister | 710/240 |
| 6,662,216 B1* | 12/2003 | Arimilli et al. | 709/218 |
| 6,799,249 B1* | 9/2004 | Englin et al. | 711/125 |
| 6,868,087 B1* | 3/2005 | Agarwala et al. | 370/412 |
| 6,966,061 B1* | 11/2005 | Vance et al. | 718/100 |
| 6,976,135 B1* | 12/2005 | Talbot et al. | 711/151 |
| 7,213,087 B1* | 5/2007 | Bertone et | 710/56 |
| 7,631,132 B1* | 12/2009 | Neuman | 710/244 |
| 2002/0049802 A1* | 4/2002 | Nakahara et al. | 709/103 |
| 2003/0172316 A1* | 9/2003 | Tremblay et al. | 714/7 |
| 2004/0030861 A1* | 2/2004 | Plackle et al. | 712/32 |
| 2005/0091121 A1* | 4/2005 | Charney et al. | 705/26 |
| 2006/0136640 A1* | 6/2006 | Tuan | 710/260 |
| 2009/0248994 A1* | 10/2009 | Zheng et al. | 711/151 |
| 2010/0106912 A1* | 4/2010 | Cypher et al. | 711/141 |
| 2011/0131385 A1* | 6/2011 | Henriksson et al. | 711/158 |

FOREIGN PATENT DOCUMENTS

| | | | |
|---|---|---|---|
| JP | 10333954 A | * | 12/1998 |
| JP | 2000132527 A | * | 5/2000 |
| JP | 2007241577 A | * | 9/2007 |
| JP | 2009020883 A | * | 1/2009 |
| JP | 2012093944 A | * | 5/2012 |
| WO | WO 9941669 A1 | * | 8/1999 |

OTHER PUBLICATIONS

"NN8507698: Achieving the Appearance of Write Atomicity and Program Order", Jul. 1, 1985, IBM, IBM Technical Disclosure Bulletin, vol. 28, Iss. 2, pp. 698-700.*

Tai-Hua Lu; Chung-Ho Chen; Kuen-Jong Lee, "Effective Hybrid Test Program Development for Software-Based Self-Testing of Pipeline Processor Cores," Very Large Scale Integration (VLSI) Systems, IEEE Transactions on , vol. 19, No. 3, pp. 516,520, Mar. 2011.*

Ramamoorthy, C.V.; Wah, B., "An Optimal Algorithm for Scheduling Requests on Interleaved Memories for a Pipelined Processor," Computers, IEEE Transactions on , vol. C-30, No. 10, pp. 787,800, Oct. 1981.*

* cited by examiner

CENTRALIZED SERIALIZATION OF REQUESTS IN A MULTIPROCESSOR SYSTEM

BACKGROUND

This invention relates generally to processing within a computing environment and more particularly to serializing requests in a multiprocessor system.

Multiprocessor systems can take a variety of forms and individual designs may contain many unique features. Common among multiprocessor systems is the requirement to resolve shared resource conflicts. Shared resource conflicts occur when more requestors attempt to access a shared resource than the resource can process at a given time. Resolving this type of conflict necessitates serialized access. As bandwidth between processors and caches is increasing at a faster rate than bandwidth between caches and memory, and an overall number of physical memory interfaces remains the same due to chip input/output constraints, physical memory is a shared resource that is more commonly experiencing access contention from many requestors. If requests for shared resources, such as memory, are not resolved fairly, requests may time-out or large variations in request service time may develop. Time-out and variations in request service time contribute to an overall degradation in system performance. As the number and speed of processors increase, efficient and equitable shared resource coordination is even more desirable.

Currently, shared resource coordination employs pre-priority filtering that holds requests for a processor in a pipeline until a targeted resource becomes available. A request is looped out of and back into the pipeline until the targeted resource is available. Pre-priority filtering relies on a central pipeline structure that employs rank priority at a final request group level to meet performance requirements of minimizing latency to local caches. Another existing approach to workload coordination employs a round-robin scheme. The round-robin scheme provides the pipeline with course-grain control over allocation of memory request slots.

BRIEF SUMMARY

An embodiment is a method of serializing memory instructions in a multiprocessor system. The method includes receiving a plurality of processor requests at a central point in the multiprocessor system. Each of the plurality of processor requests includes a needs register having a requestor needs switch and a resource needs switch. The method also includes establishing a tail switch indicating the presence of the plurality of processor requests at the central point, establishing a sequential order of the plurality of processor requests, and processing the plurality of processor requests at the central point in the sequential order.

Another exemplary embodiment is a device configured to serialize instructions in a multiprocessor system. The device includes memory for storing a program, and a processor functionally coupled to the memory. The processor is configured to be responsive to computer-executable instructions contained in the program and operative for receiving a plurality of processor requests at a central point in the multiprocessor system. Each of the plurality of processor requests includes a needs register having a requestor needs switch and a resource needs switch. The processor is also configured to be responsive to computer-executable instructions contained in the program and operative for establishing a tail switch indicating the presence of the plurality of processor requests at the central point, establishing a sequential order of the plurality of processor requests, and processing the plurality of processor requests at the central point in the sequential order.

Another exemplary embodiment is a computer program product for serializing instructions in a multiprocessor system. The computer program product includes a tangible storage medium readable by a processing circuit and storing instructions for execution by the processing circuit for performing a method. The method includes receiving a plurality of processor requests at a central point in the multiprocessor system. Each of the plurality of processor requests includes a needs register having a requestor needs switch and a resource needs switch. The method also includes establishing a tail switch indicating the presence of the plurality of processor requests at the central point, establishing a sequential order of the plurality of processor requests, and processing the plurality of processor requests at the central point in the sequential order.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments provide a system and method of serializing processor requests in a multiprocessor system. The method establishes a central fairness for processing requests. The system establishes a sequential order of a plurality of processor requests and then processes each request in the sequential order. Processing requests in a sequential order reduces latency issues associated with requests that are pending in a queue of a resource waiting loop only to be bumped from a queue position by a new request entering the loop and reaching the resource at a point when the resource is available to receive a processor request.

Technical effects and benefits include the ability to process tasks in a sequential order based upon task arrival at a central point. The sequential order establishes a central fairness that prevents later arriving tasks to be processed before tasks that arrive earlier at a particular processor. The central fairness leads to fewer latency issues and enhances overall task processing time.

Figure 1:
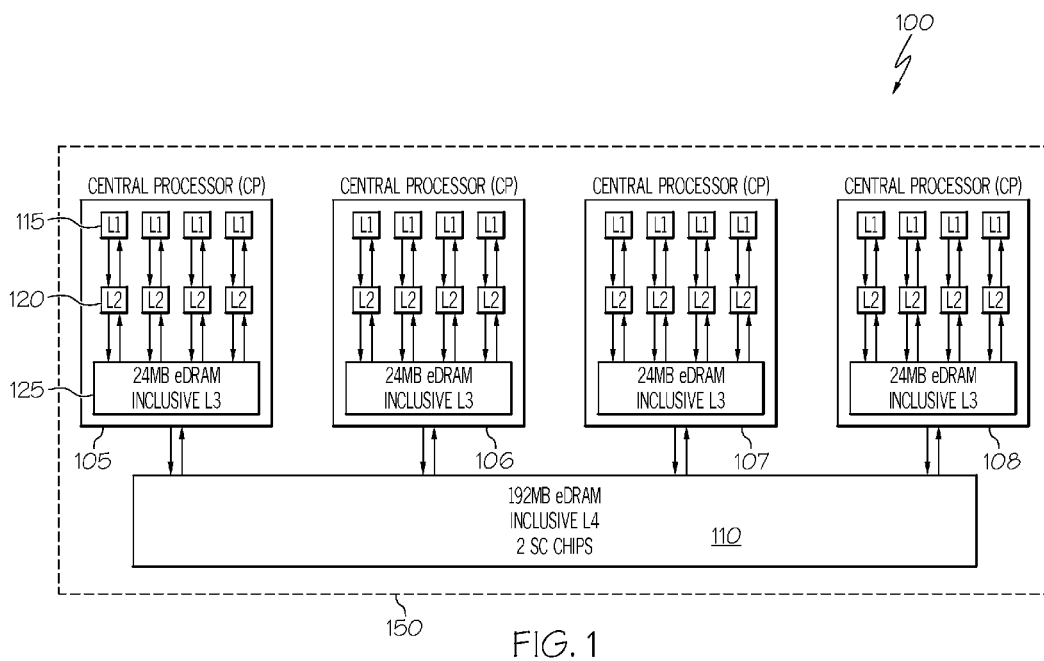
FIG. 1 is a block diagram depicting a multiprocessor system in accordance with an exemplary embodiment.
Figure 2:
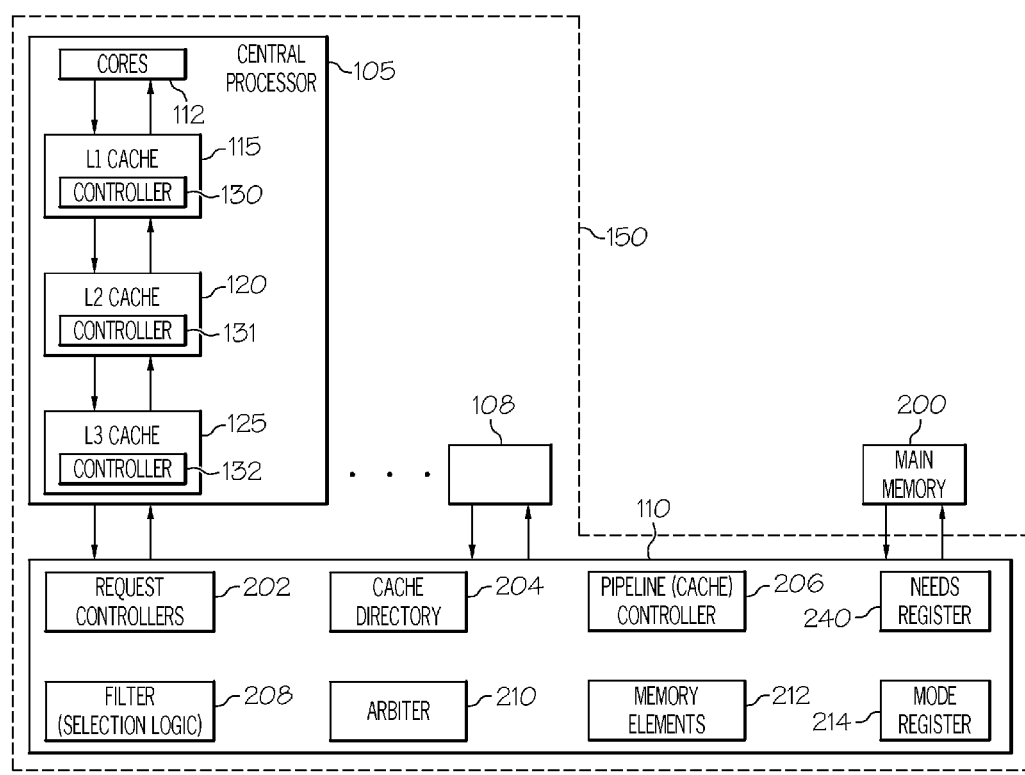
FIG. 2 is a block diagram illustrating a processor of the multiprocessor system of FIG. 1.

FIGS. 1 and 2 illustrate a cache topology 100. Topology 100 includes a plurality of central processors (CP) (also referred to as central processing units) 105-108 operatively connected via busses to one or more L4 caches 110. Each of the central processors (CP) 105-108 includes one or more cores 112, such as shown in connection with CP 105 in FIG. 2. Core 112 reads and executes instructions passed to topology 100. Each core 112 of each central processor (CP) 105 is operatively connected via busses to corresponding L1 caches 115, L2 caches 120, and an L3 cache 125 that include a corresponding controller 130, 131, and 132. L1 caches 115 are physically closest to the cores 112, next are L2 caches 120, and then L3 caches 125. Although L3 caches 125 and L4 caches 110 may comprise embedded dynamic random access memory (DRAM) which is referred to as eDRAM, it is understood by a skilled artisan that any other types of suitable memory such as SRAM may be utilized. A plurality of central processors 105 operatively connected to L4 caches 110 (e.g., two L4 caches) form a node 150. In a computing system, multiple such nodes 150 may be operatively connected to one another for communicating such as making and responding to requests, as understood by one skilled in the art.

Each individual central processor 105-108 is fabricated on a separate chip that includes the L1 caches 115, L2 caches 120, and L3 caches 125. L4 cache 110 is fabricated on another chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others. In the exemplary embodiment shown central processors 105-108 are operatively connected to a single L4 cache 110. However, it should be understood that exemplary embodiment may include one or more processors connected to one or more L4 caches and multiple memory chips.

In accordance with exemplary embodiments, processors 105-108 exchange data with memory 200 through L4 cache 110. Data exchange takes the form of, for example, requests for access to memory 200. The requests, each having a unique request identifier (ID) may pass from requestors such as L1 caches 115, L2 caches 120, L3 caches 125, cores 112, and other nodes 150 to a resource, also having a unique resource identifier (ID) on L4 cache 110. The requestors may be on the same and/or different central processors 105-108. Requestors may be on the same and/or different nodes 150. Also, the requestor may be any I/O controller (not shown), as understood by one skilled in the art. Each requestor is able to individually request access to a desired resource necessary to process a task on L4 cache 110 through a request controller 202. Resources on the L4 cache may include accessing the cache directory 204, a pipeline controller 206, a filter 208, an arbiter 210, memory elements 212, and a mode register 214. Resources may also include accessing a main memory 200 through L4 cache 110. Also note that although exemplary embodiments depict examples with respect to the L4 cache 110, it is understood that exemplary embodiments are not meant to be limited to operations of the L4 cache 110. For example, the technique discussed herein applies equally to the L3 cache 125 receiving requests from, e.g., the L2 cache 120 and the L4 cache 110. In addition, L3 cache 125 may include the elements shown and described for the L4 cache 110. Also, exemplary embodiments may be implemented in, e.g., main memory 200, external memory (not shown), etc. Furthermore main memory 200 and external memory may include the elements shown and described for the L4 cache 110. L4 cache 110 is also shown to include a needs register 240 which, as will be discussed more fully below, establishes a desired serialization of requests passing through request controller 202. Also note that although the exemplary embodiment describes a system and method of serializing processor memory requests, it can also be applied for serializing other types of requests that require a shared common resource.

Figure 3:
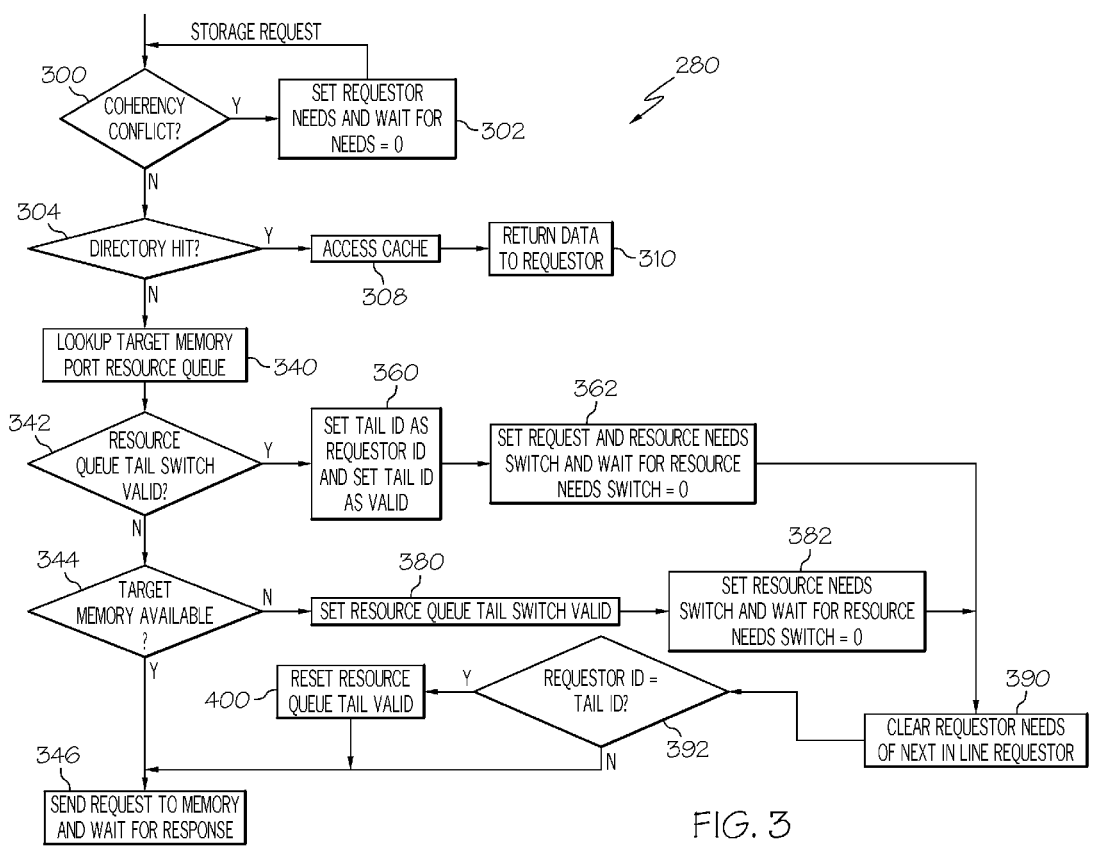
FIG. 3 is a flow chart depicting a method of serializing memory process requests in a cache of the multiprocessor system of FIG. 2.

Reference will now follow to FIG. 3 in describing a method 280 of serializing requests to a central point. In accordance with one aspect of the exemplary embodiment, the requests take the form of memory requests passing to L4 cache 110 or main memory 200 from central processors 105-108. Of course, it should be readily understood that method 280 can be employed to serialize other requests for resources in a multiprocessor system. After receiving a new storage request, request controller 202 determines whether there exists a coherency conflict in block 300. If a coherency conflict exists, a requestor needs switch in needs register 240 is set in block 302 and the request is passed back to block 300. Once the coherency conflict request is resolved, a determination is made in block 304 whether cache directory 204 indicates the request exists in the cache ("directory hit"). If cache directory 204 indicates a directory hit, access is granted to L4 cache 110 in block 308 and data is returned to the requestor in block 310. If cache directory 204 does not indicate a directory hit in block 304, request controller 202 looks up a target memory port queue in block 340.

At this point, a determination is made in block 342 whether a resource queue switch is valid. That is, in block 342, a determination is made whether there exists any other requests in the target memory queue. If no other requests exist, a determination is made in block 344 whether the target memory is available. If available, the request is passed to the target memory and request controller 202 awaits a response in block 346. If, on the other hand, the resource queue tail switch is valid, i.e., there currently exists one or more requests awaiting access to the target memory, the unique request ID of the new storage request is assigned as the request tail or the last request in the queue in block 360. Then needs register 240 sets a request needs switch and a resource needs switch for the new storage request in block 362. The request needs switch identifies the location of the new storage request in the resource queue. That is, the resource queue is sequentially ranked in the order that requests arrive at the resource.

In accordance with one aspect of the exemplary embodiment, the request switch is associated with the request in the resource queue immediately before to the new storage request. That is, the request switch is associated with the request ID of the last request to enter the resource queue prior to entrance of the new storage request. The resource needs switch identifies the particular resource queue that the new storage request has entered. Request controller 202 then waits for the resource needs switch to go to zero ("0") meaning that the resource is ready for the request. Once the resource needs switch goes to zero, the resource needs switch is cleared for the next request in the resource queue in block 390 and a determination is made whether the requestor ID is equal to or the same as the resource tail request ID in block 392. If so, the new request is last request to be processed. As such, the resource queue tail switch is reset in block 400 and the request is passed to memory in block 346. If the requestor needs switch does not equal the tail request, the request is simply passed to memory in block 346.

If the resource queue tail switch is not valid, that is, there are no other requests in the queue in block 342, and the target memory is unavailable in block 344, the resource queue tail switch is set as valid in block 380. That is, the new storage request is accepted in the queue as the tail request and the presence of the new storage request is made known to needs register 240. At this point, the resource queue tail switch is set valid in block 380, needs register 240 sets the resource needs switch in block 382 and request controller 204 waits for the resource needs switch to go to zero ("0"). When the resource needs switch goes to zero, the resource needs switch is cleared for the next request, if any, in the resource queue in block 390. In manner similar to that described above, a determination is made whether the requestor ID is equal to the resource tail request ID in block 392. If so, the new request is last request to be processed. As such, the resource queue tail switch is reset in block 400 and the request is passed to memory in block 346. If the requestor needs switch does not equal the tail request, the request is simply passed to memory in block 346.

Figure 4:
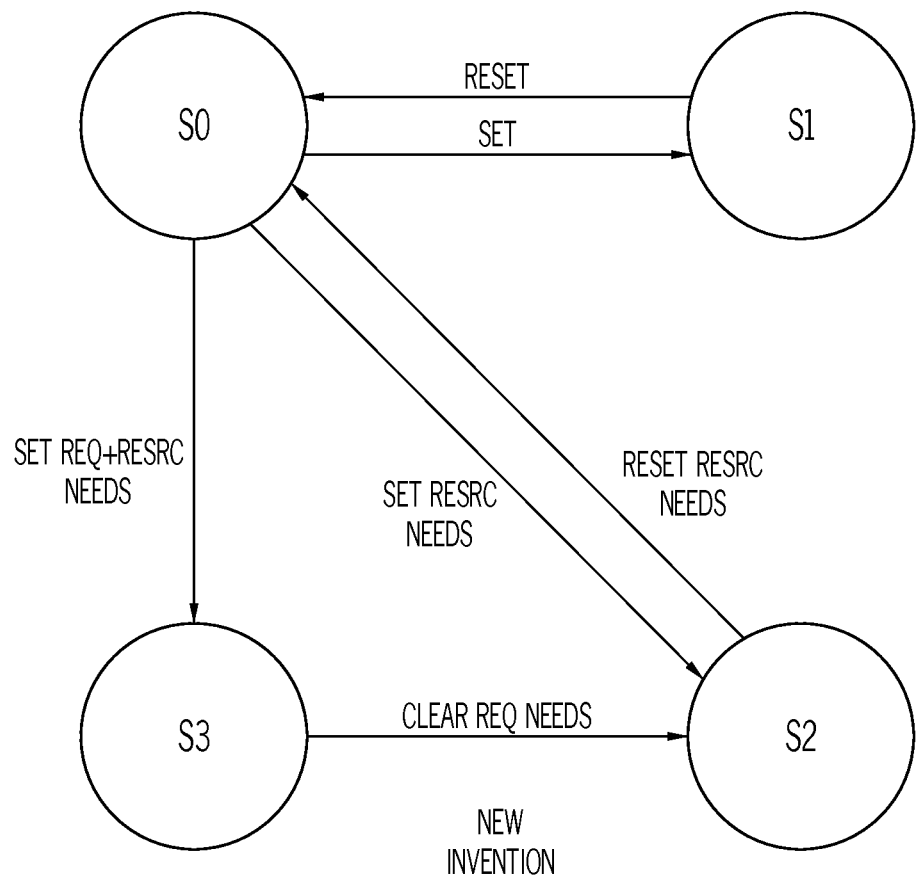
FIG. 4 is a flow chart depicting needs register state transitions for the method of serializing processor requests of FIG. 2.
Figure 5:
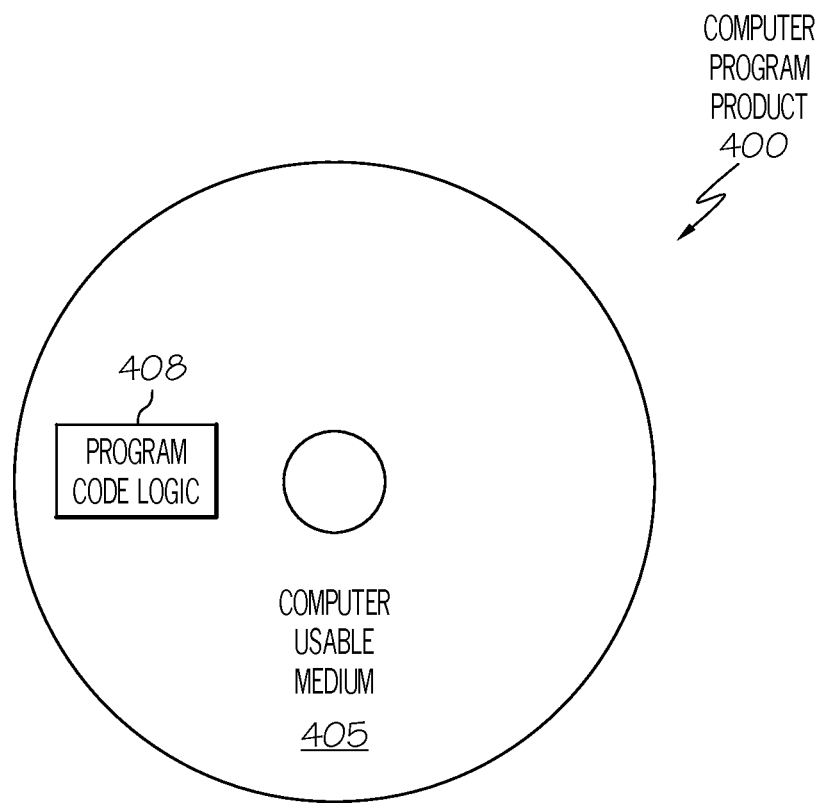
FIG. 5 depicts an exemplary embodiment of an article of manufacture incorporating one or more aspects of the exemplary embodiment.

Reference will now follow to FIG. 4 in describing state transitions in needs register 240. State S0 equals no needs set, state S1 equals requestor needs switch set, state S2 equals resource needs set, and state S3 equals requestor needs switch and resource needs switch set. When a new storage request is shown to have a state of S0 or S2, the request is deemed to be at the head of the target resource queue. A transition from S0 to S2 only occurs when the queue is empty. States S0 and S3 designate that the resource is the tail request. S0 indicates that the request is the only resource in the queue, i.e., the request is both the head and the tail of the queue. S3 indicates that new request is last in the queue and that there are additional requests ahead of the new request. Transition to the head of the queue, e.g., a transition from S3 to S2 occurs when the request needs switch matches the current head of the queue and the head of the queue sends a request to the target resource. Removal from the head of the queue, e.g., a transition from S2 to S0 occurs when a target resource become available.

In accordance with the exemplary embodiments, requests sent to a target resource queue are processed in sequential order. That is, each request is processed in the order that the request enters the queue. Requests entering the queue after another request must wait for previous requests to be processed before being passed to memory themselves. As such, no request is trapped in a request loop waiting to hit a target resource at an opportune time, e.g., when the resource is ready to receive a new request. In this manner, no requests are moved ahead of others causing delays in processing or process hang ups while a request is pending.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer program product 400 including a compute readable medium 405 having computer program code logic 408 that can direct a computer, other programmable data processing apparatus, or other devices to function in a particular manner, such that the instructions stored in the computer readable medium 405 produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of serializing instructions in a multiprocessor system, the method comprising:
   receiving processor requests from a plurality of processors at a central point in a pipeline of the multiprocessor system, each of the processor requests passing from a resource queue to a needs register having a request needs switch identifying a location of a previous storage request in the resource queue and a resource needs switch residing at the central point, the resource needs switch being associated with one of a plurality of destination resources;
   establishing a tail switch indicating the presence of the processor requests at the central point, the tail switch being updated for each new processor request and indicating an end of the resource queue;
   establishing a sequential order of the processor requests; and
   processing the processor requests at the central point in the sequential order, wherein the resource needs switch is cleared when the processor request passes to a resource for processing.

2. The method of claim 1, wherein the resource needs switch of each of the processor requests is associated with one of the plurality of processors.

3. The method of claim 1, wherein the processor requests include a first processor request and a second processor request, the first and second processor requests establishing the sequential order.

4. The method of claim 3, wherein the second processor request is associated with the first processor request.

5. The method of claim 3, further comprising:
   passing the first processor request to the central point for processing; and
   clearing the requestor need switch for the second processor request thereby establishing the second processor request as a new first processor request.

6. The method of claim 5, further comprising:
   passing the new first processor request back to the central point only after the first processor request is complete;
   processing the new first processor request; and
   clearing the tail switch indicating that all processor requests in the sequential order have been processed at the processor.

7. The method of claim 5, further comprising: tagging the second processor request as a processor request tail.

8. The method of claim 7, further comprising:
   receiving a new processor request;
   adding the new processor request to the sequential order after the processor request tail; and
   tagging the new processor request as the processor request tail.

9. The method of claim 8, wherein adding the new processor request to the sequential order includes associating the requestor need register of the new processor request with the processor request tail.

10. A device configured to serialize instructions in a multiprocessor system, the device comprising:
    memory for storing a program; and
    a processor, the device configured to perform a method comprising:
    receiving processor requests from a plurality of processors at a central point of a pipeline of the multiprocessor system, each of processor requests passing from a resource queue to a needs register having a request needs switch identifying a location of a previous storage request in the resource queue and a resource needs switch residing at the central point, the resource needs switch being associated with one of a plurality of destination resources;
    a tail switch being updated with each new processor request and identifying an end of the resource queue;
    establishing a sequential order of the processor requests; and
    processing the processor requests at the central point in the sequential order, wherein the resource needs switch is cleared when the processor request passes to a resource for processing.

11. The device of claim 10, wherein the resource needs switch of each of the processor requests is associated with the processor.

12. The device of claim 10, wherein the processor requests includes a first processor request and a second processor request, the first and second processor requests establishing the sequential order.

13. The device of claim 12, wherein the requestor needs switch of the second processor request is associated with the first processor request.

14. The device of claim 12, further comprising:
    passing the first processor request to the central point for processing; and
    clearing the requestor needs switch for the second processor request thereby establishing the second processor request as a new first processor request.

15. The device of claim 14, further comprising:
    passing the new first processor request back to the central point only after the first processor request is complete;
    processing the new first processor request; and
    clearing the tail switch indicating that all processor requests in the sequential order have been processed at the central point.

16. The device of claim 14, further comprising:
    tagging the second processor request as a processor request tail;

receiving a new processor request;

adding the new processor request to the sequential order after the processor request tail;

tagging the new processor request as the processor request tail.

17. A computer program product for serializing instructions in a multiprocessor system, the computer program product comprising a non-transitory tangible storage medium readable by a processing circuit and storing instructions for execution by the processing circuit for performing a method comprising:

receiving processor requests from a plurality of processors at a central point of a pipeline of the multiprocessor system, each of the processor requests passing from a resource queue to a needs register having a request needs switch identifying a location of a previous storage request in the resource queue and a resource needs switch residing at the central point, the resource needs switch being associated with one of a plurality of destination resources;

establishing a tail switch indicating the presence of the one or more requests processor requests at the processor, the tail switch being updated with each new processor request and indicating an end of the resource queue;

establishing a sequential order of the one or more requests processor requests; and processing the processor requests at the central point in the sequential order, wherein the resource needs switch is cleared when the processor request passes to a resource for processing.

18. The computer program product of claim 17, wherein the processor requests includes a first processor request and a second processor request, the first and second processor requests establishing the sequential order.

19. The computer program product of claim 18, wherein the requestor needs switch of the second processor request is associated with the first processor request.

20. The computer program product of claim 19, further comprising:

passing the first processor request to the central point for processing;

clearing the requestor need switch for the second processor request thereby establishing the second processor request as a new first processor request;

passing the new first processor request back to the central point only after the first processor request is complete;

processing the new first processor request; and clearing the tail switch indicating that all processor requests in the sequential order have been processed at the central point.

* * * * *